(12) United States Patent
Eriksson et al.

(10) Patent No.: US 11,603,013 B2
(45) Date of Patent: *Mar. 14, 2023

(54) SYSTEM AND METHOD FOR FAULT HANDLING IN A PROPULSION SYSTEM FOR AN ELECTRIC VEHICLE

(71) Applicant: Volvo Car Corporation, Gothenburg (SE)

(72) Inventors: Robert Eriksson, Hälta (SE); Nikitas Sidiropoulos, Öjersjo (SE)

(73) Assignee: Volvo Car Corporation, Gothenburg (SE)

( * ) Notice: Subject to any disclaimer, the term of this patent is extended or adjusted under 35 U.S.C. 154(b) by 412 days.

This patent is subject to a terminal disclaimer.

(21) Appl. No.: 16/836,996

(22) Filed: Apr. 1, 2020

(65) Prior Publication Data

US 2020/0353843 A1   Nov. 12, 2020

(30) Foreign Application Priority Data

May 7, 2019   (EP) .................................... 19173040

(51) Int. Cl.
  *H02P 1/00*   (2006.01)
  *H02P 3/00*   (2006.01)
  (Continued)

(52) U.S. Cl.
  CPC ............. *B60L 58/20* (2019.02); *B60L 3/003* (2013.01); *B60L 50/66* (2019.02); *H02M 7/537* (2013.01);
  (Continued)

(58) Field of Classification Search
  CPC ........... B60L 58/20; B60L 50/66; B60L 3/003
  (Continued)

(56) References Cited

U.S. PATENT DOCUMENTS 9,899,948 B2 *   2/2018   Butzmann ............. B60L 15/007
2007/0120520 A1   5/2007   Kaneko
(Continued)

FOREIGN PATENT DOCUMENTS

DE   102012002023 A1   12/2012
DE   102015214276 A1   2/2017
(Continued)

OTHER PUBLICATIONS

Oct. 16, 2019 European Search Report issue on International Application No. EP1973040.

(Continued)

*Primary Examiner* — Erick D Glass
(74) *Attorney, Agent, or Firm* — Clements Bernard Walker; Christopher L. Bernard

(57) ABSTRACT

A propulsion system for an electric vehicle comprising a high voltage battery unit having a first high voltage battery connected in series with a second high voltage battery, which may also be referred to as a first and second battery bank, and one or more power inverters arranged to connect the battery banks to one or more electric machines. The one or more power inverters and the one or more electric machines are configured to form a first and a second three-phase system. The described architecture incorporating dual battery banks, and dual and/or multiphase inverters and electric machines can provide enhanced redundancy and limp home functionality in cases where a fault or error occurs in the inverter and/or in the electric machine so that a faulty three-phase system can be operated in a safe-state mode.

12 Claims, 6 Drawing Sheets

(51) Int. Cl.
*H02P 5/00* (2016.01)
*B60L 58/20* (2019.01)
*B60L 50/60* (2019.01)
*B60L 3/00* (2019.01)
*H02M 7/537* (2006.01)
*H02P 25/22* (2006.01)
*H02P 27/06* (2006.01)
*H02P 29/028* (2016.01)
*B60L 15/20* (2006.01)

(52) U.S. Cl.
CPC ............. *H02P 25/22* (2013.01); *H02P 27/06* (2013.01); *H02P 29/028* (2013.01); *B60L 15/20* (2013.01)

(58) Field of Classification Search
USPC ........................................................ 318/139
See application file for complete search history.

(56) References Cited

U.S. PATENT DOCUMENTS

| 2008/0304189 | A1 | 12/2008 | Tang et al. |
| 2009/0033253 | A1 | 2/2009 | Nagashima et al. |
| 2015/0162855 | A1 | 6/2015 | Chien et al. |
| 2016/0006276 | A1 | 1/2016 | Mikulec et al. |
| 2018/0105164 | A1* | 4/2018 | Jung ..................... B60W 20/50 |
| 2020/0247239 | A1* | 8/2020 | Stoltz .................. B60W 10/115 |
| 2022/0289044 | A1* | 9/2022 | Downs, Jr. .......... B60L 15/2036 |

FOREIGN PATENT DOCUMENTS

| DE | 102017217298 A1 | 3/2019 |
| FR | 3031844 A1 | 7/2016 |
| GB | 2550955 A | 12/2017 |
| JP | 2006025518 A | 1/2006 |
| KR | 20100122839 A | 12/2010 |
| WO | 2018227307 A1 | 12/2018 |

OTHER PUBLICATIONS

Shang et al., Hybrid hydrogen PEM fuel cell and batteries without DC-DC converter, International Journal of Low-Carbon Technologies, vol. 11, Issue 2, May 1, 2016, pp. 205-210.

Howroyd, Powerpath controller for fuel cell & battery hybridisation, Aeronautical & Automotive Engineering, Loughborough University, LE11 3TU, United Kingdom, pp. 1-10.

Oct. 14, 2022 Office Action issued in the corresponding EP Application No. 19173040.7.

* cited by examiner

SYSTEM AND METHOD FOR FAULT HANDLING IN A PROPULSION SYSTEM FOR AN ELECTRIC VEHICLE

CROSS-REFERENCE TO RELATED APPLICATIONS

The present disclosure claims the benefit of priority of co-pending European Patent Application No. 19173040.7, filed on May 7, 2019, and entitled "SYSTEM AND METHOD FOR FAULT HANDLING IN A PROPULSION SYSTEM FOR AN ELECTRIC VEHICLE," the contents of which are incorporated in full by reference herein for all purposes. The present disclosure also incorporates European Patent Application Nos. 19173020.9 and 19173027.4 in full by reference herein.

TECHNICAL FIELD

The present disclosure relates to systems and methods for fault handling in a propulsion system for an electric vehicle.

BACKGROUND

Electric vehicles generally relate to vehicles that have batteries or battery units that store energy, where the batteries are designed to provide electric power for propelling and accelerating the vehicle and also for providing power to electric systems used in the vehicle. The stored energy is consumed when the electric vehicle is driven, and the battery needs to be re-charged to replenish the level of stored energy through a connection to an external electric power supply.

Due to the existing charging infrastructure with charging stations having different properties, it has been found that it is advantageous to be able to charge the vehicle using different charging voltages, such as 400V and 800V. Moreover, propulsion systems exist for operation at either 400V or 800V. In view of the above, there is an ongoing development of propulsion systems for electric vehicles which are capable of receiving both a 400V and an 800V charging voltage.

In a propulsion system for an electric vehicle, errors and faults such as sensor failures in the electric machine or in the inverter must be handled in such a way that the vehicle can still be operated even if the functionality and performance is reduced, for example in a so called limp home mode, until the driver can take the vehicle to a safe location or to a workshop. Furthermore, if the vehicle speed is high when a fault occurs it is important that the failed system can be maintained in a safe-state long enough for the vehicle speed to be reduced to levels low enough to be able to exit the safe-state mode and drive the vehicle for a longer time in a limp home mode, or for the driver to safely be able to drive the vehicle to a workshop.

In view of the above, there is an ongoing development of propulsion systems for electric vehicles which are capable of receiving both a 400V and an 800V charging voltage. However, the development of propulsion systems architectures capable of handling both 400V and 800V comes with challenges but also provides new opportunities for how to implement the required fault handling functionalities.

Accordingly, there is room for further improvement of fault handling in propulsion systems for electric vehicles that allow for safe-state and limp home operation.

SUMMARY

In general, the disclosed subject matter relates to a propulsion system for an electric vehicle and to fault handling in a dual battery bank propulsion system. The system comprises a high voltage battery unit comprising a first high voltage battery connected in series with a second high voltage battery, which may also be referred to as a first and second battery bank and one or more power inverters arranged to connect the battery banks to one or more electric machines. The one or more power inverters and the one or more electric machines are together configured to form a first and a second three-phase system.

The invention is based on the realization that an architecture incorporating dual battery banks, and dual and/or multiphase inverters and electric machines can provide enhanced redundancy and limp home functionality in cases where a fault or error occurs in an inverter and/or in an electric machine so that a faulty three-phase system can be operated in a safe-state mode. Two safe-state modes which can be used when a fault or error occur in the inverter and/or the electric machine are referred to as a safe pulse-off and an active short-circuit mode.

The safe pulse-off mode is a safe-state mode where the inverter transistors are left in an open state, switching of the transistors is stopped and the voltage, current and phase angle to the electric machine is no longer controlled. The safe pulse-off mode can be used as long as the back-EMF (back electromotive force) in the electric machine is lower than the corresponding DC-voltage of the battery to which the back-EMF is applied, via an inverter. The relation between the AC back-EMF voltage and the DC voltage includes the voltage drop which occurs when power is transferred from DC to AC and vice versa in the inverter. The amplitude of the voltage drop varies depending on the modulation technique used in the inverter.

Active short-circuit is a safe-state mode which may be achieved by leaving the lower inverter transistors in each phase leg in an on-state, switching of the transistors is stopped and current and voltage is circulating between the phases of the inverter and the phases of the electric machine in a closed short-circuited loop. The active short-circuit mode can thereby be used also for a back-EMF which is higher than the corresponding DC-voltage of the high-voltage battery. However, this also means that the components of the inverter and of the electric machine must be able to manage the active short-circuit current levels for the amount of time that this safe-state mode is engaged. Moreover, a brake torque occurs as a result of the magnetic circuit in the electric machine. This brake torque may influence the safety of the vehicle and must therefore not exceed a certain brake torque threshold level to avoid excessive and unsafe speed retardation.

The back-EMF of the electric machine, sometimes referred to as the counter-electromotive force, is the power of the magnetic flux constant and the rotational speed of the Electric Machine, which in turn is proportional to the vehicle speed. As long as the corresponding DC voltage of the battery is not exceeded by the back-EMF, no current will be charged back to the high voltage battery, and thus there is no risk for overcharging or battery contactor opening. However, in cases where the back-EMF is higher than a corresponding DC voltage of the battery, the current will flow towards the DC link through the anti-parallel diodes and charge the battery in an uncontrolled manner. Accordingly, the safe pulse-off mode can be used without any current being back-fed into the DC circuit up to a certain rotation speed of the electric machine. In cases where the back-EMF is higher than the corresponding DC battery voltage, it is preferable to instead use the active short-circuit mode.

The described propulsion system further comprises a propulsion system control unit configured to detect a fault in the first or the second three-phase system, wherein the inverter of the three-phase system comprising the phase where the fault was detected is configured to operate in an active short-circuit mode if the back-EMF of the faulty three-phase system is higher than the corresponding DC operating voltage of the battery and in a safe pulse-off mode if the back-EMF of the faulty three-phase system is lower than the corresponding DC operating voltage of the high voltage battery unit.

Accordingly, by means of the described system architecture comprising dual battery banks, safe pulse-off can be performed at a higher vehicle speed compared to in a single bank battery system since the back-EMF may be as high as the combined voltage of the first and second high voltage batteries, i.e. as high as the nominal operating voltage of the high-voltage battery unit comprising the first and second high-voltage battery arranged in series. For even higher back-EMF, the active short-circuit mode can be used as a safe state mode while the non-faulty three-phase system provide limp-home functionality of the vehicle. Thereby, both safe pulse-off and active short-circuit functionality can be improved or avoided and thus an enhanced redundancy and limp-home functionality can be achieved.

According to an example embodiment, the respective operating voltage of the first and second high voltage battery may be 400V meaning that safe pulse-off can be performed for a back-EMF up to 800V which is then the nominal operating voltage of the high-voltage battery unit.

Further features of, and advantages with, embodiments of the present disclosure will become apparent when studying the appended claims and the following description. The skilled person realize that different features of the present invention may be combined to create embodiments other than those described in the following, without departing from the scope of the present invention.

DESCRIPTION OF EMBODIMENTS

Figure 1:
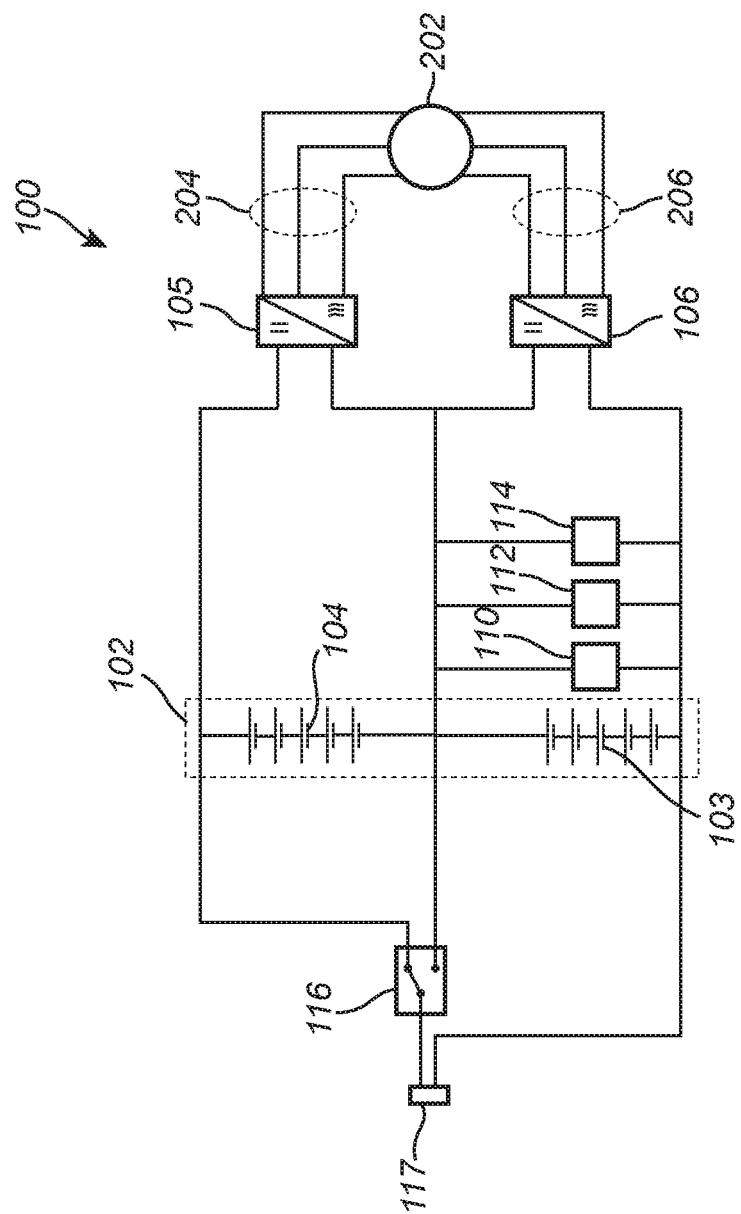
FIG. 1 schematically illustrates a propulsion system according to an embodiment of the invention.

In the present detailed description, various embodiments of a propulsion system and a method for controlling the propulsion system according to the present invention are described. However, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

FIG. 1 schematically illustrates a propulsion system 100 according to an embodiment of the invention. The propulsion system 100 comprises a high voltage battery unit 102 having a first high voltage battery 103 connected in series with a second high voltage battery 104 such that a nominal operating voltage of the high voltage battery unit 102 is the sum of a voltage of the first high voltage battery 103 and a voltage of the second high voltage battery 104. The first and second high voltage batteries 103, 104 may also be referred to as battery banks 103, 104.

The system 100 illustrated in FIG. 1 further comprises a first three-phase power inverter 105 connected to a first set 204 of three phases of a dual winding three-phase electric machine 202 and a second three-phase power inverter 106 connected to a second set 206 of three phases of the dual winding three-phase electric machine 202. The first three-phase system is here formed by the first three-phase power inverter 105 and the first set 204 of three phases of the dual winding three-phase electric machine 202 and the second three-phase system is formed by the second three-phase power inverter 106 and the second set 206 of three phases of the dual winding three-phase electric machine 202.

The system further comprises a propulsion system control unit (not shown) configured to detect a fault in the first or the second three-phase system, wherein the inverter of the three-phase system comprising the phase where the fault was detected is configured to operate in a safe-state mode.

If a back electromotive force, back-EMF, of the faulty three-phase system is lower than or equal to the operating voltage of the high voltage battery unit, the propulsion system control unit is configured to control the inverter of the faulty three-phase system to operate in a safe pulse-off mode, where transistors of the inverter are in an open state and switching of the transistors is stopped. In the safe pulse-off mode, transistors of the power inverter in the faulty three-phase system are maintained in an open state and switching of the transistors is stopped. It can be assumed that the inverter transistors can be left in an open state and that switching of the transistors can be stopped for most failures of the three-phase system. Examples of failures include resolver failure in the electric machine, current sensor failure in the inverter, and temperature sensor failure in the inverter or in the electric machine. The one of the first and second three-phase system where a fault has been detected will be referred to as the faulty three-phase system and the other three-phase system will be referred to as the non-faulty three-phase system. Accordingly, even if a fault is detected in e.g. a phase of the electric machine, the entire three-phase system comprising the faulty phase will be treated as being faulty.

If a back electromotive force, back-EMF, of the faulty three-phase system is higher than the operating voltage of the high voltage battery unit, the propulsion system control unit is configured to control the inverter of the faulty three-phase system to operate in an active short-circuit mode, where transistors of the inverter are kept in a closed state, switching of the transistors is stopped and current and voltage is circulating between the inverter and the electric machine of the non-faulty three-phase system in a closed short-circuited loop.

Since the active short-circuit mode introduces short-circuit currents in the closed loop between the inverter and the electrical machine and in addition a braking force in the electrical machine, it is desirable to use the safe pulse-off mode to the largest extent possible. In the described architecture, it is possible to utilize the safe pulse-off mode up to a back-EMF corresponding to the operating voltage of the high-voltage battery unit, e.g. 800V. Since the back-EMF is linearly dependent on the speed of the electric machine, it means the safe pulse-off mode can be used at higher vehicle speeds. If the vehicle speed is too high, resulting in a back-EMF higher than the operating voltage of the high voltage battery unit, it is not possible to use the safe pulse-off mode, and the active short-circuit mode is used instead. The active short-circuit mode is then preferably used until the vehicle speed is sufficiently reduced for the safe-pulse-off mode to be used. There is thus a transition from the active short-circuit mode to the safe pulse-off mode when the speed of the vehicle is reduced so that the back-EMF is reduced to be equal to or lower than the operating voltage of the high voltage battery unit.

The active short-circuit current and brake torque can be reduced if the back-EMF in the electric machine is reduced. Thus, by introducing a concept where back-EMF is reduced in a faulty system e.g. by field weakening introduced from a non-faulty system, the active short-circuit current and brake torque can be reduced in the faulty system. This can enable the system to run for a longer time in active short-circuit mode since the affected components through which the short current runs will have a higher design margin in relation to their current capability. Another potential benefit that comes from reducing the back-EMF and thus the active short-circuit by field weakening from a non-faulty parallel system, is that the electric machine can be better optimized in terms of performance and efficiency since it can be allowed to be designed with a larger back-EMF. Other parameters in addition to the back-EMF that affect the active short-circuit current and brake torque is the inductance and the resistance of the electric machine.

Since the power-inverters may be configured to operate at a higher voltage (e.g. 800V) compared to in a single battery bank system, e.g. a 400V system, there is also a lower risk of damage to inverter components when active short-circuit is used in the embodiments of the described system comprising a single power inverter. In embodiments comprising dual inverters, each converter may be configured to operate at 400V and to be connected to a high voltage battery, in which case the corresponding DC voltage to which the back-EMF is compared is the voltage of one battery bank, e.g. 400V. Similarly, in embodiments comprising one inverter configured to provide a DC voltage corresponding to the operating voltage of the high voltage battery unit, e.g. 800V, a higher back-.EMF is allowed. However, in embodiments comprising two inverters it is also possible to provide dual inverters capable of handling the voltage of the high-voltage battery unit, e.g. 800V.

According to example embodiments of the invention, the non-faulty three-phase system is configured to provide vehicle propulsion and/or regenerative braking in a limp-home mode of the vehicle. Thereby, the limp-home functionality is improved since the non-faulty three-phase system, here a 400V system, can be still be used to operate the vehicle.

In the following examples, a nominal operating voltage of the first and second high voltage battery 103, 104 is taken to be 400V. This means that an actual operating voltage may be somewhat above or below the nominal operating voltage at any given point in time depending on e.g. the state of charge of the battery and other operating conditions. Accordingly, a nominal operating voltage of the high voltage battery unit 102 is here 800V.

Since the back-EMF, which is defined as a voltage, is directly proportional to the rotational speed of the electric machine, which in turn is proportional to the vehicle speed, a higher allowed back-EMF means that the safe pulse-off mode may be entered at a higher vehicle speed. Moreover, as a result of the redundancy provided by the described propulsion system 100 comprising a first and a second three-phase system, the vehicle can enter into a so called limp home mode where it is being operated by the non-faulty three-phase system.

The maximum amplitude of the back-EMF is dictated by the properties of the electric machines used, an in particular by the power of the electric machines. According to various embodiments of the invention, the systems can be designed so that a faulty sub-system, i.e. the first or second three-phase system, of the propulsion system can be operated in a safe pulse-off mode for the entire allowable range of vehicle speeds. In operation, the back-EMF can be determined as the product of the speed and the magnetic flux constant of the electric machine, where the speed of the electric machine can be determined by measuring the rotor position.

Depending on the system configuration used, the transistor components in the one or more power inverters used may be dimensioned to withstand voltage transient levels occurring when switching up to the highest DC bus voltage, in this example up to 800V. This to allow a current from the non-faulty three-phase system to flow from the electric machine 202 through the non-faulty inverter and to the high voltage battery unit 102 and vice versa depending on if the electric machine 202 is operated in generator mode or in motor mode. Accordingly, each of the one or more power inverters may be configured to operate at a voltage corresponding to a nominal operating voltage of the high voltage battery unit 102. During normal operation (i.e. when both three-phase systems are non-faulty) there will be voltage transients during switching which are above the operating DC voltage level. Accordingly, inverter transistors rated for 1200V are preferably used for 800V applications. The transients will appear in both peak torque and in a field-weakening speed region. During safe mode operation there will be no switching transients of the faulty three-phase system since it has been stopped from switching while the normally operating 3-phase system will experience transients as usual.

The propulsion system control unit may be a separate control unit, or the functionality of the propulsion system control unit may be provided by several different control units. Each power inverter may for example comprise a control unit capable of detecting a fault in either of the described three-phase systems, and to control the propulsion system to operate in a safe pulse-off mode as described above.

Moreover, the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may for example be a general-purpose ECU (electric control unit), or one or more application specific control units.

The claimed methods for controlling the vehicle propulsion system can thereby be performed by control units of the various described components, for example under control of a coordinating propulsion system control unit or by one or more generic vehicle ECUs (electronic control units).

According to an example embodiment of the invention, the propulsion system control unit is configured to control the non-faulty three-phase system of the first and second three-phase system to provide field weakening current control to reduce the magnetic field in the faulty three-phase system. Field weakening is achieved by controlling the D-axis and Q-axis current in the Electric Machine. The current control is for example done by the motor core software in the power inverter. The D-axis current is increased in a negative direction to decrease the magnetic flux in the machine (thus called field weakening). The positive Q-axis current is simultaneously decreased. By using field weakening in the non-faulty system, the short-circuit current and braking torque of the faulty system is reduced which in turn reduces the back-EMF and thereby allows the propulsion system to use the safe pulse-off mode at a higher vehicle speed compared to if no field weakening is used, meaning that it may be possible to avoid using the active short-circuit mode.

The illustrated propulsion system further 100 comprises a plurality of loads 110, 112, 114 which are here arranged to be powered the first high voltage battery 103. It should be noted that the loads equally well may be powered by the second high voltage battery 104. By connecting the loads to one of the 400V battery banks 103, 104, conventional 400V components may be used also in an 800V propulsion system in order to maximize the features in common with a 400V system, thereby reducing the cost and complexity of the 800V system 100, and in particular to facilitate the transition from 400V to 800V system architectures. The loads 110, 112, 114 may for example be components operating at 400V such at heaters, climate control systems or the like, or the loads may be DC/DC converters down-converting the 400V voltage for providing power to a 48V system and/or to a 12V system.

Moreover, the system 100 comprises a switch 116 connected to a DC-charging inlet 117, the switch 116 being configured to connect the DC-charging inlet 117 to the first high voltage battery 103 or to the high voltage battery unit 102 based on an amplitude of a received voltage from the DC-charging inlet 117. Thereby, the vehicle may be charged by an external charging unit using either a 400V or an 800V input voltage.

Figure 2:
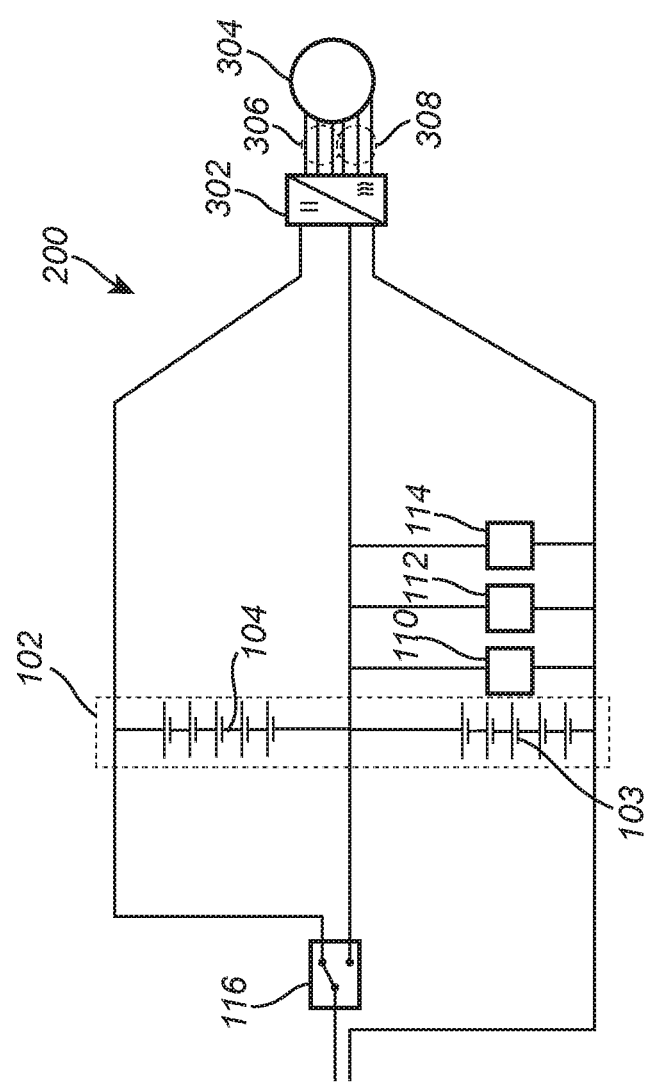
FIG. 2 schematically illustrates a propulsion system according to an embodiment of the invention.

FIG. 2 schematically illustrates a propulsion system 200 according to an example embodiment of the invention. The system comprises a six-phase power inverter 302 connected to a six-phase electric machine 304, wherein the first three-phase system is formed by a first set of three phases 306 of the six-phase power inverter 302 and a corresponding first set of three phases 306 of the six-phase electric machine 304 and the second three-phase system is formed by a second set of three phases 308 of the six-phase power inverter 302 and a corresponding second set of three phases 308 of the six-phase electric machine 304.

The six-phase power inverter 302 is configured to provide two different voltages, e.g. 400V and 800V, in order to be able to charge both of the first and second high voltage batteries 103, 104 as well as a high-voltage battery unit 102. The operation of the system of FIG. 2 is similar to what is described above with reference to the system illustrated by FIG. 1. A power inverter 302 configured to operate at 800V may preferably be rated at 1200V, meaning that it is capable of handling a higher back-EMF compared to a 400V inverter which may be rated at e.g. 700V.

Figure 3:
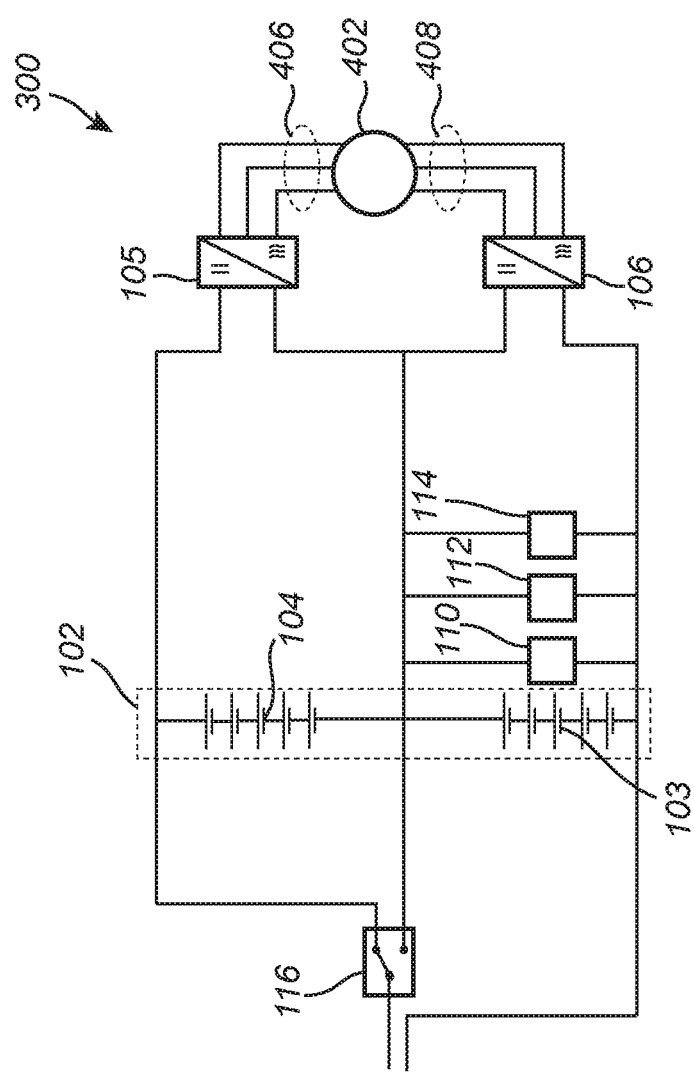
FIG. 3 schematically illustrates a propulsion system according to an embodiment of the invention.

FIG. 3 schematically illustrates a propulsion system 300 according to an example embodiment of the invention. The propulsion system 300 comprises a first three-phase inverter 105 connected to a first set 406 of three phases of a six-phase electric machine 402 and a second three-phase inverter 106 connected to a second set 408 of three phases of the six-phase electric machine 402, wherein the first three-phase system is formed by the first three-phase power inverter 105 and of a first set of three phases 406 of the six-phase electric machine 402 and the second three-phase system is formed by the second three-phase power inverter 106 and a second set of three phases 408 of the six-phase electric machine 402. The operation of the system of FIG. 3 is similar to what is described above with reference to the systems illustrated by FIGS. 1-2.

Figure 4:
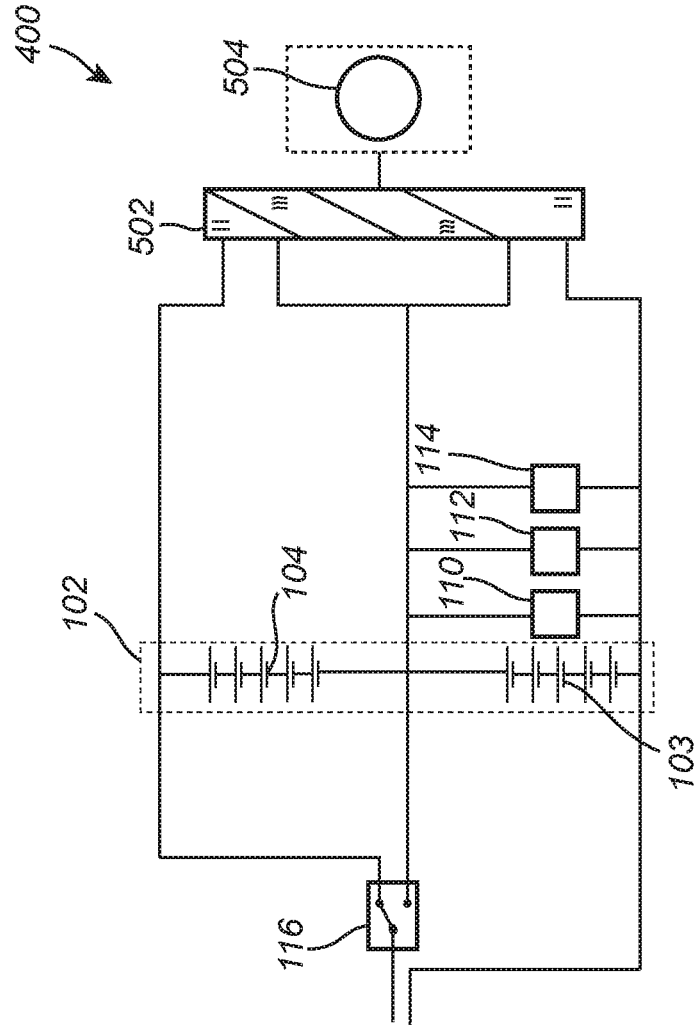
FIG. 4 schematically illustrates a propulsion system according to an embodiment of the invention.

FIG. 4 schematically illustrates a propulsion system 400 according to an example embodiment of the invention. The propulsion system 400 comprises a multilevel power inverter 502 connected to an electric machine 504, wherein the propulsion system control unit is configured to detect a fault in a level of the multilevel inverter 504 and to control a non-faulty level of the multilevel inverter 504 to provide vehicle propulsion and/or regenerative braking. The multilevel inverter 502 may be a six-phase power-inverter and the electric machine a corresponding three-phase or six-phase electric machine. A fault in a level of the multilevel inverter 502 means a fault in between two of the levels in the inverter. The multilevel inverter 502 in FIG. 4 may have 3 levels. 0V, 400V and 800 V. Half of the modules of the inverter 502 contain transistors and diodes operating between 0V and 400 V and half of them between 400V and 800V. If a fault occurs in the modules working between 0-400V connected to the first battery bank, the other modules working between 400 and 800V connected to the second battery bank can still operate the vehicle but with decreased performance compared to when all modules are operating, e.g. in a limp-home mode. Further operation of the system of FIG. 4 is similar to what is described above with reference to the systems illustrated by FIGS. 1-3.

Figure 5:
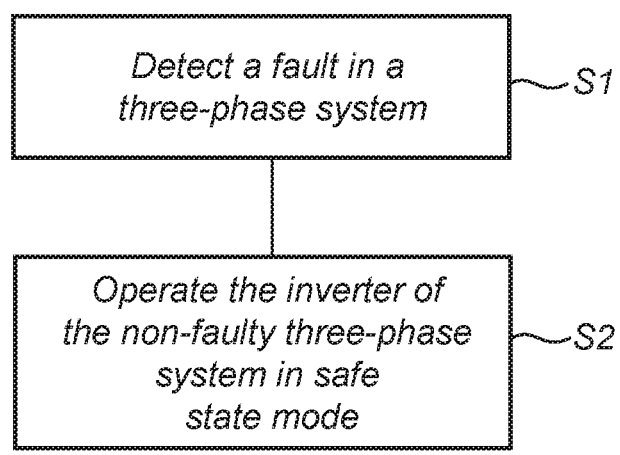
FIG. 5 is a flow chart schematically outlining steps of a method of controlling a propulsion system according to embodiments of the invention.

FIG. 5 is a flow chart outlining general steps of a method according to embodiments of the invention. The method comprises detecting S1, by a propulsion system control unit, a fault in the first or the second three-phase system; and operating S2 the first and second three-phase systems in a safe-state mode. The safe-state mode may be either a safe pulse-off mode or an active short-circuit mode as described above.

Figure 6:
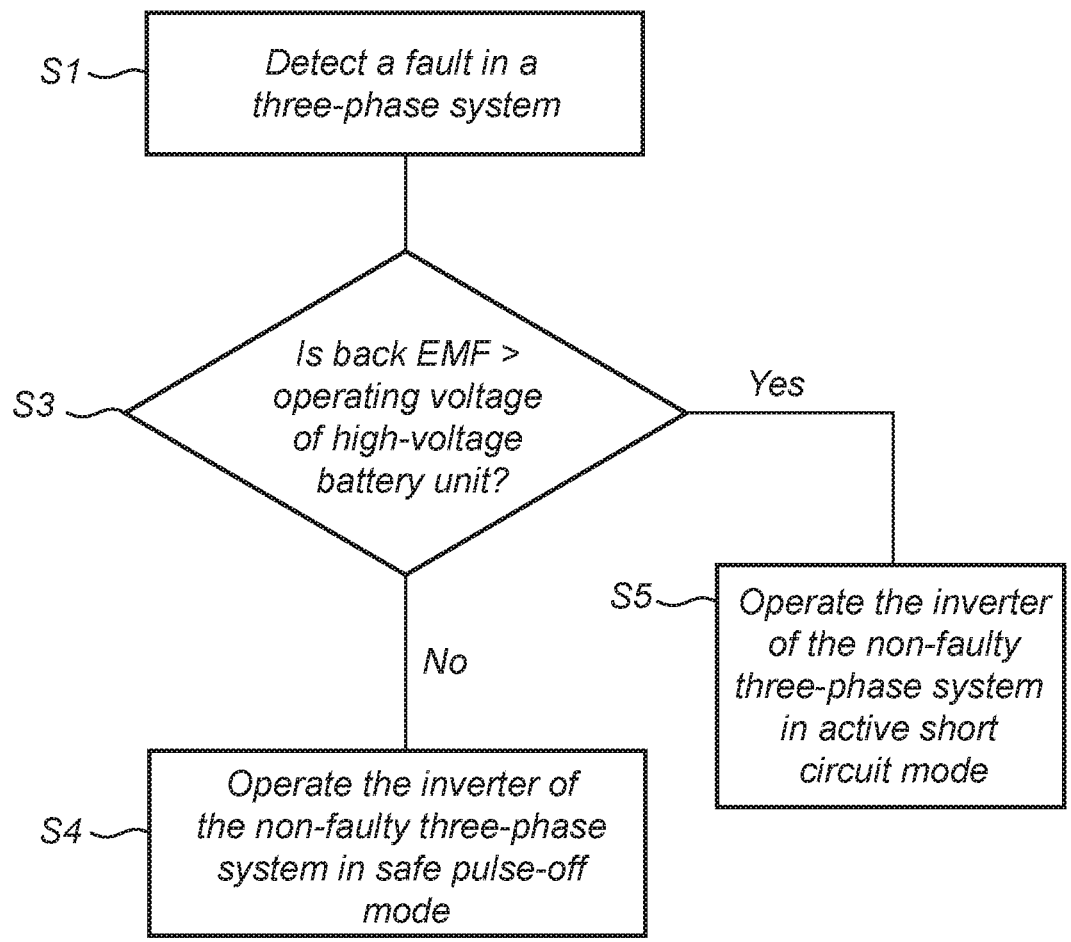
FIG. 6 is a flow chart schematically outlining steps of a method of controlling a propulsion system according to embodiments of the invention.

FIG. 6 is a flow chart outlining general steps of methods according to embodiments of the invention. The method comprises, if S3 a back-EMF of the faulty three-phase system is higher than the operating voltage of the high voltage battery unit 102, operating S4 the inverter of the faulty three-phase system in an active short-circuit mode. If S3 the back-EMF of the faulty three-phase system is instead lower than or equal to the operating voltage of the high voltage battery unit 102, the method comprises operating S5 the inverter of the faulty three-phase system in a safe pulse-off mode. The step of determining if S3 the back-EMF of the faulty three-phase system is lower or higher than the battery voltage can be performed by comparing a measured back-EMF with a measured battery voltage.

Even though the invention has been described with reference to specific exemplifying embodiments thereof, many different alterations, modifications and the like will become apparent for those skilled in the art. Also, it should be noted that parts of the system may be omitted, interchanged or arranged in various ways, the system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A propulsion system for an electric vehicle, the system comprising:
 a high voltage battery unit having a first high voltage battery connected in series with a second high voltage battery such that a nominal operating voltage of the high voltage battery unit is the sum of a voltage of the first high voltage battery and a voltage of the second high voltage battery;
 a six-phase power inverter arranged to connect the high voltage battery unit and the first high voltage battery to a six-phase electric machine, wherein the power inverter and the electric machine are configured to form a first and a second three-phase system; and
 a propulsion system control unit configured to:
 detect a fault of the first or the second three-phase system and operate the first and second three-phase systems in a safe-state mode, wherein, if a back electromotive force, back-EMF, of the faulty three-phase system is higher than the operating voltage of the high voltage battery unit, the propulsion system control unit is configured to control the inverter to operate the faulty three-phase system in an active short-circuit mode, where transistors of the inverter are kept in a closed state, switching of the transistors is stopped and current and voltage is circulating between the inverter and the electric machine of the non-faulty three-phase system in a closed short-circuited loop.

2. The propulsion system according to claim 1, wherein the propulsion system control unit configured is further configured to operate the vehicle in a limp-home mode where the speed of the vehicle does not exceed a threshold speed.

3. The propulsion system according to claim 1, wherein, if a back electromotive force, back-EMF, of the faulty three-phase system is lower than or equal to the operating voltage of the high voltage battery unit, the propulsion system control unit is configured to control the inverter to operate the faulty three-phase system in a safe pulse-off mode, where transistors of the inverter are in an open state and switching of the transistors is stopped.

4. The propulsion system according to claim 1, wherein the propulsion system control unit is configured to control the non-faulty three-phase system of the first and second three-phase system to provide field weakening current control to reduce the magnetic field in the faulty three-phase system.

5. The propulsion system according to claim 1, wherein the power inverter is configured to operate at a voltage corresponding to a nominal operating voltage of the high voltage battery unit.

6. The propulsion system according to claim 1, comprising the six-phase power inverter connected to the six-phase electric machine, wherein the first three-phase system is formed by a first set of three phases of the six-phase power inverter and a corresponding first set of three phases of the six-phase electric machine and the second three-phase system is formed by a second set of three phases of the six-phase power inverter and a corresponding second set of three phases of the six-phase electric machine.

7. The propulsion system according to claim 1, comprising a multilevel power inverter connected to the electric machine, wherein the propulsion system control unit is configured to detect a fault in a level of the multilevel power inverter and to control a non-faulty level of the multilevel power inverter to provide vehicle propulsion and/or regenerative braking.

8. A method for controlling a propulsion system for an electric vehicle having a high voltage battery unit having a first high voltage battery connected in series with a second high voltage battery such that a nominal operating voltage of the high voltage battery unit is the sum of a voltage of the first high voltage battery and a voltage of the second high voltage battery and a six-phase power inverter arranged to connect the high voltage battery unit and the first high voltage battery to a six-phase electric machine, wherein the power inverter and the electric machine are configured to form a first and a second three-phase system; the method comprising:
 detecting, by a propulsion system control unit, a fault in the first or the second three-phase system; and
 operating the first and second three-phase systems in a safe-state mode comprising, if a back electromotive force, back-EMF, of the faulty three-phase system is higher than the operating voltage of the high voltage battery unit, operating the inverter of the faulty three-phase system in an active short-circuit mode, where transistors of the inverter are kept in a closed state, switching of the transistors is stopped and current and voltage is circulating between the inverter and the electric machine of the non-faulty three-phase system in a closed short-circuited loop.

9. The method according to claim 8, further comprising operating the vehicle in a limp-home mode where the speed of the vehicle does not exceed a threshold speed.

10. The method according to claim 8, further comprising, if a back electromotive force, back-EMF, of the faulty three-phase system is lower than or equal to the operating voltage of the high voltage battery unit, operating the inverter of the faulty three-phase system in a safe pulse-off mode, where transistors of the inverter are in an open state and switching of the transistors is stopped.

11. The method according to claim 8, further comprising providing field weakening current control in the non-faulty three-phase system to reduce the magnetic field in the faulty three-phase system.

12. A propulsion system for an electric vehicle, the system comprising:
 a high voltage battery unit having a first high voltage battery connected in series with a second high voltage battery such that a nominal operating voltage of the high voltage battery unit is the sum of a voltage of the first high voltage battery and a voltage of the second high voltage battery;
 one or more power inverters arranged to connect the high voltage battery unit and the first high voltage battery to one or more electric machines, wherein the one or more power inverters and the one or more electric machines are configured to form a first and a second three-phase system; and
 a propulsion system control unit configured to:
 detect a fault of the first or the second three-phase system and operate the first and second three-phase systems in a safe-state mode,
 wherein the propulsion system control unit is configured to control the non-faulty three-phase system of the first and second three-phase system to provide field weakening current control to reduce the magnetic field in the faulty three-phase system.

\* \* \* \* \*